US008752738B2

(12) United States Patent (10) Patent No.: US 8,752,738 B2
Szekely et al. (45) Date of Patent: Jun. 17, 2014

(54) DISPENSER AND METHODS

(75) Inventors: Alex S. Szekely, Jackson, NJ (US); Richard H. Seager, North Stonington, CT (US)

(73) Assignee: Plastek Industries, Inc., Erie, PA (US)

( * ) Notice: Subject to any disclaimer, the term of this patent is extended or adjusted under 35 U.S.C. 154(b) by 0 days.

(21) Appl. No.: 13/643,318

(22) PCT Filed: Jan. 6, 2012

(86) PCT No.: PCT/US2012/020471
§ 371 (c)(1),
(2), (4) Date: Oct. 25, 2012

(87) PCT Pub. No.: WO2012/094588
PCT Pub. Date: Jul. 12, 2012

(65) Prior Publication Data
US 2013/0270304 A1 Oct. 17, 2013

Related U.S. Application Data

(60) Provisional application No. 61/430,511, filed on Jan. 6, 2011.

(51) Int. Cl.
*G01F 11/28* (2006.01)
(52) U.S. Cl.
USPC ........... 222/426; 222/427; 222/443; 222/452; 222/454
(58) Field of Classification Search
USPC ............... 222/42, 47, 48, 355, 365, 367, 426, 222/427, 428, 429, 443, 450, 451, 452, 454, 222/455
See application file for complete search history.

(56) References Cited

U.S. PATENT DOCUMENTS 614,646 A * 11/1898 Cloud ........................... 222/427
1,586,781 A * 6/1926 Case et al. ................. 222/541.2
1,914,766 A 6/1933 Zaloschan
(Continued)

FOREIGN PATENT DOCUMENTS

| JP | 11-105950 A | 4/1999 |
|----|---|---|
| JP | 2006-021779 A | 1/2006 |
| KR | 10-2003-0027931 A | 4/2003 |
| KR | 20-2009-0001976 U | 3/2009 |

OTHER PUBLICATIONS

International Search Report and Written Opinion for PCT/US2012/020471, dated Aug. 22, 2012.

*Primary Examiner* — Kevin P Shaver
*Assistant Examiner* — Patrick M Buechner
(74) *Attorney, Agent, or Firm* — Bachman & LaPointe, P.C.

(57) ABSTRACT

A chamber member is mounted to a bottle body and has an opening and partially bounds a first chamber and a second chamber. A selector is mounted to the chamber body for relative rotation between a first dosing condition and a second dosing condition. In the first dosing condition: flow is not blocked from the first chamber out the opening; flow is blocked from the second chamber out the opening; flow is blocked from the bottle interior to the first chamber; and flow is not blocked from the bottle interior to the second chamber. In the second dosing condition: flow is blocked from the first chamber out the opening; flow is not blocked from the second chamber out the opening; flow is not blocked from the bottle interior to the first chamber; and flow is blocked from the bottle interior to the second chamber.

24 Claims, 6 Drawing Sheets

(56) References Cited

U.S. PATENT DOCUMENTS

| | | | | |
|---|---|---|---|---|
| 2,877,937 A | * | 3/1959 | Weir | 222/452 |
| 3,130,874 A | * | 4/1964 | Bulmer | 222/142.8 |
| 3,866,805 A | * | 2/1975 | Hamilton, Jr. | 222/427 |
| 4,120,432 A | * | 10/1978 | Fuchs | 222/565 |
| 4,143,794 A | * | 3/1979 | Stratford et al. | 222/42 |
| 6,948,641 B1 | * | 9/2005 | Williams | 222/456 |

* cited by examiner

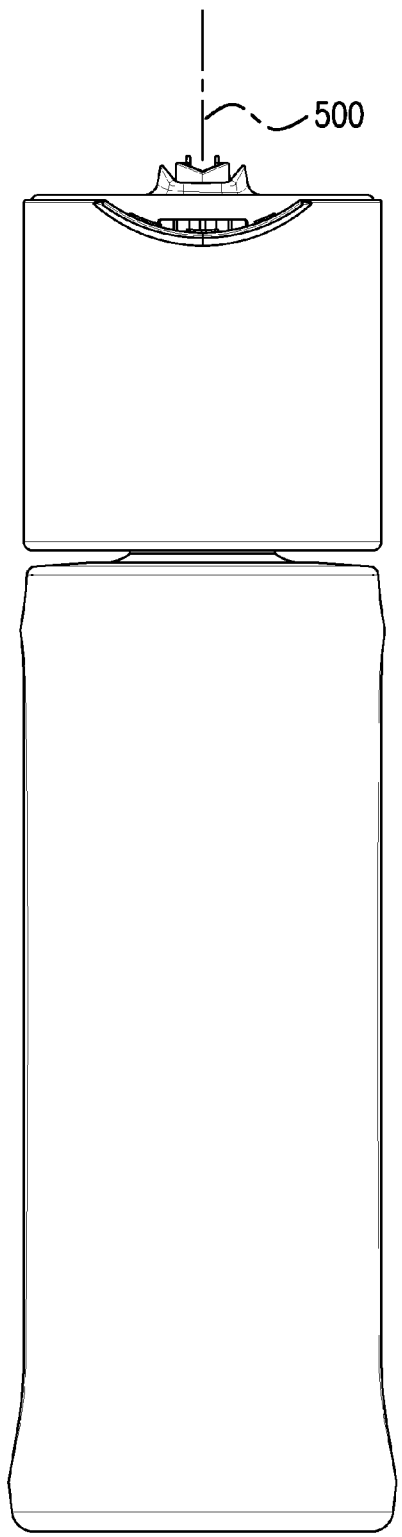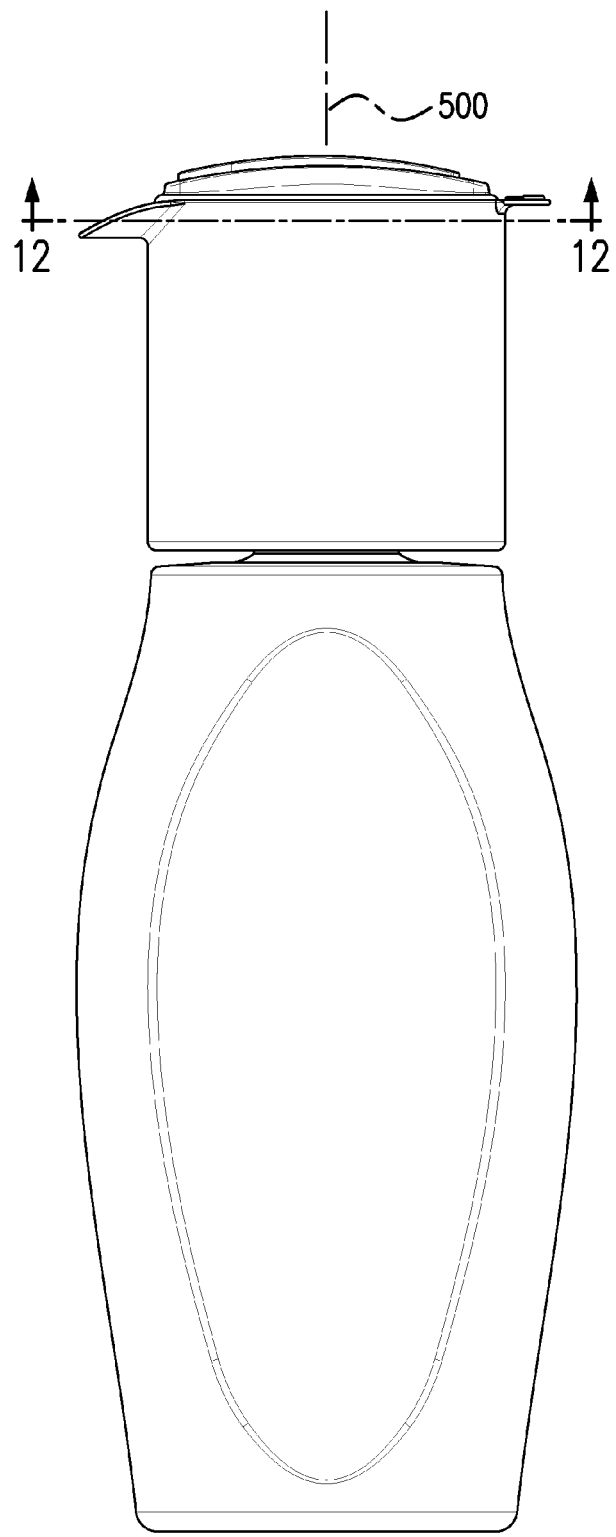
FIG. 4
FIG. 5

DISPENSER AND METHODS

CROSS-REFERENCE TO RELATED APPLICATION

Benefit is claimed of U.S. patent application Ser. No. 61/430,511, filed Jan. 6, 2011, and entitled "Dispenser and Methods", the disclosure of which is incorporated by reference herein in its entirety as if set forth at length.

BACKGROUND OF THE INVENTION

The invention relates to dispensing of home and garden granules/powders and liquids (flowable materials) such as detergents, fabric softeners, insecticides, fertilizers and the like. More particularly, the invention relates to dosing bottles.

Exemplary flowable materials are laundry detergent, fabric softener, and home and garden chemicals (e.g., fertilizers, pesticides, insecticides).

Conventionally in such fields, dosing may be achieved via providing a combined cap and measuring cup. Exemplary such caps/cups have installed conditions screwed onto a spout fitment to close/seal a bottle.

In other fields, a number of dosing bottles have been proposed. These include U.S. Pat. No. 1,914,766 of Zaloschan.

SUMMARY OF THE INVENTION

One aspect of the invention involves an apparatus comprising a bottle body having an interior for storing a flowable material. A chamber member is mounted to the bottle body and has an opening and partially bounds a first chamber and a second chamber. A selector is mounted for relative rotation to the chamber body between a first dosing condition and a second dosing condition. In the first dosing condition: flow is not blocked from the first chamber out the opening; flow is blocked from the second chamber out the opening; flow is blocked from the bottle interior to the first chamber; and flow is not blocked from the bottle interior to the second chamber. In the second dosing condition: flow is blocked from the first chamber out the opening; flow is not blocked from the second chamber out the opening; flow is not blocked from the bottle interior to the first chamber; and flow is blocked from the bottle interior to the second chamber.

In an exemplary method of use, this would allow for the second chamber to be filled while the first chamber is dispensing and vice versa. This would occur during a single inclination (or partial inverting) of the bottle. In this example, the first time the system is inclined the filling of the second chamber would be all that occurs. In this example, the first chamber cannot pour out as it will be empty after the system is switched from a shipping mode. The user will be required to operate the selector which will switch the out flow action to the chamber that was filled during the last inclination. This same selector also opens the internal gate, allowing the chamber last emptied to be filled from the bottle.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 4 is a front view of the dispenser of FIG. 1.

FIG. 5 is a side view of the dispenser of FIG. 1.

Like reference numbers and designations in the various drawings indicate like elements.

DETAILED DESCRIPTION

Figure 1:
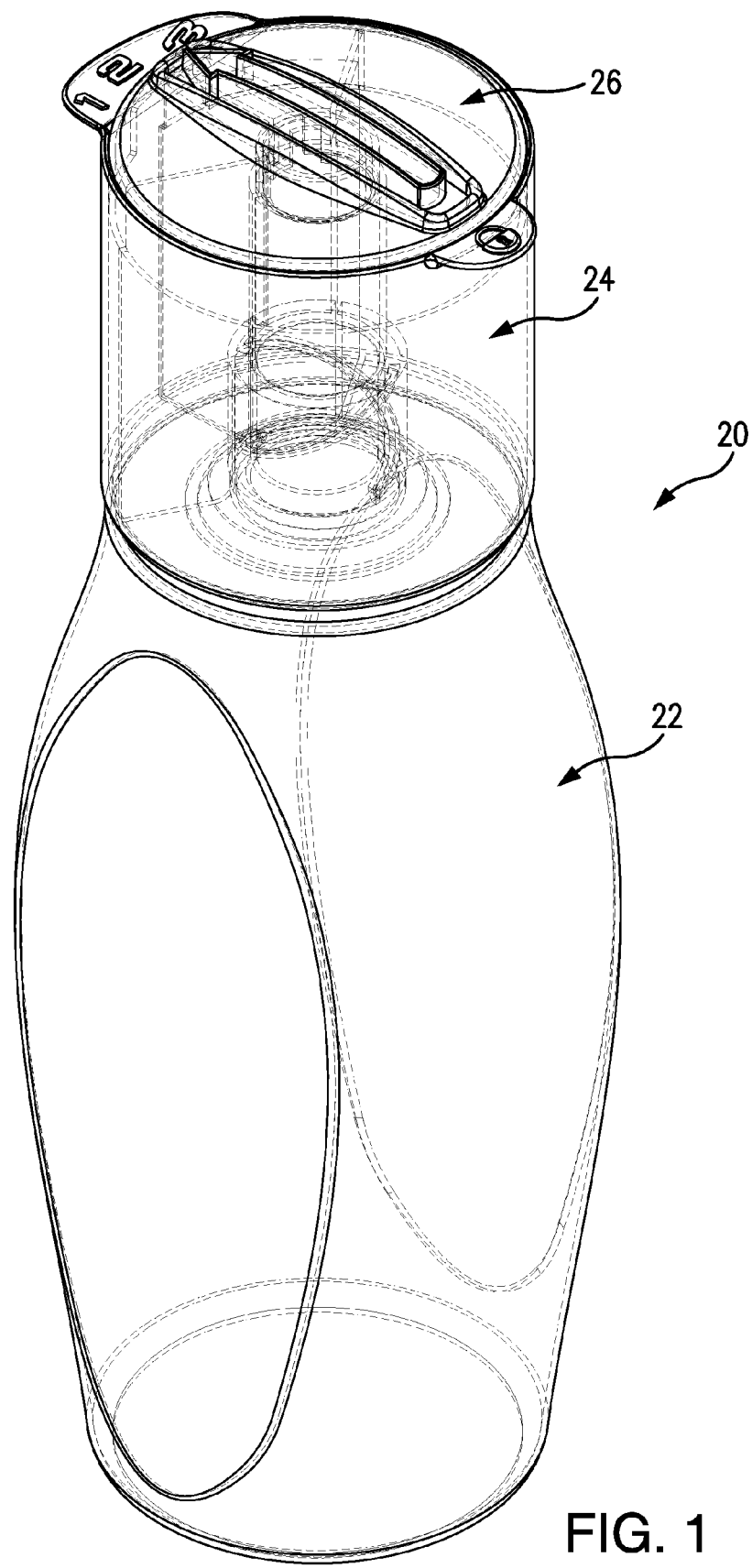
FIG. 1 is an x-ray perspective view of a dispenser in a free-pouring condition.

The FIGS. are views of an exemplary dispenser 20 formed as a three piece system of a bottle body 22 having an interior 23; a dispensing/dosing chamber body member 24; and a selector formed as a cover/closure/actuator 26.

Exemplary bottle body, chamber body, and selector materials are molded plastics such as various polyethylenes and polypropylenes.

An exemplary bottle body (injection blow molded) 22 has a neck 28 extending upward from a shoulder 29 about a central longitudinal/vertical axis 500 to a rim 30 defining an open mouth 32. The neck has an external thread 34 (or other feature) for mounting the chamber body member. The exemplary thread 34 is a double lead thread. An exemplary chamber body member (injection molded) screws onto the bottle neck/mouth and may lock with a lug or detent (not shown) thereon to prevent counter-rotation and extraction.

The exemplary chamber body member 24 comprises concentric inner 50 and outer 52 walls (annular sidewalls) joined by a lower annular bottom wall 54 and three vertical radial vanes 56, 58, 60 therebetween to define two dispensing chambers 62, 64. The inner and outer walls each have an associated inboard (inner diameter (ID)) surface and outboard (outer diameter or (OD)) surface. The exemplary inner wall ID surface may bear a feature 66 (e.g., a double helical channel) for engaging the thread 34. As is discussed further below, the first and second chambers 62 and 64 have respective inlet ports (inlets or inlet openings) and respective outlet ports (outlets or outlet openings).

An exemplary selector 26 (injection molded) snaps onto the chamber body and is held for rotation via a complementary axial detenting or locking mechanism (e.g., an annular rib and channel arrangement 92, 94 (FIG. 3) discussed below). A rotational detent mechanism (not shown) may be provided (e.g., on the rib/channel) for detenting the selector in one or more conditions/orientations (such as some or all of the four conditions mentioned below). An indicator 80, such as an arrow (e.g., molded to the upper web 82 of the selector), may indicate the particular condition.

Figure 3:
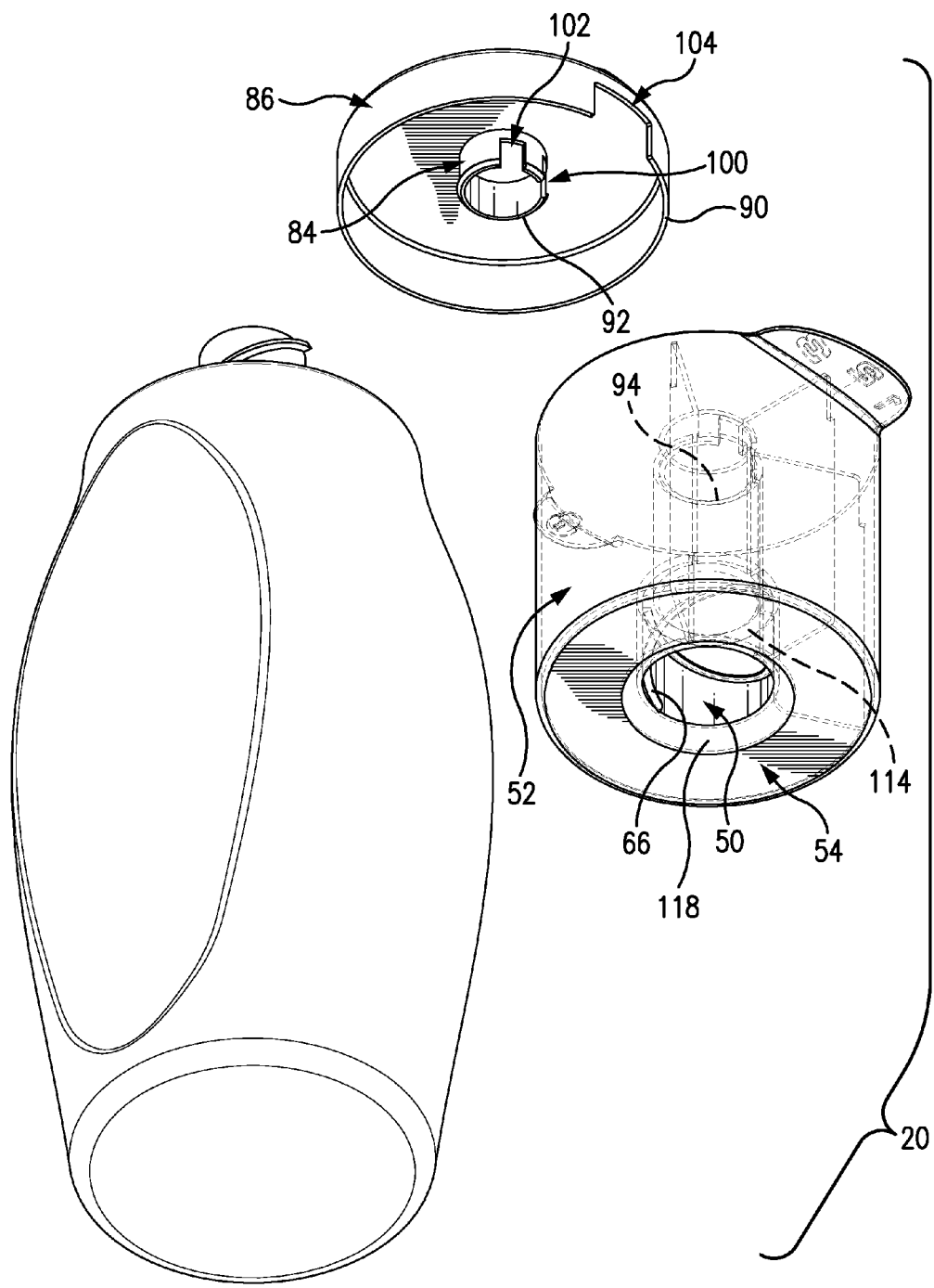
FIG. 3 is a second exploded perspective view of the dispenser of FIG. 1 with chamber member in x-ray.

Exemplary dose volume is one fluid ounce (30 ml), more broadly 15-75 ml. Exemplary bottle interior volume is about 32 fluid ounces (one liter, more broadly, 0.4-4.0 liter or 0.4-2.0 liter) (e.g. sufficient to contain that much flowable material). FIG. 3 also shows an exemplary bottle as having a sidewall extending upward to the shoulder from a base or bottom (which may support the bottle in a standing condition).

Figure 2:
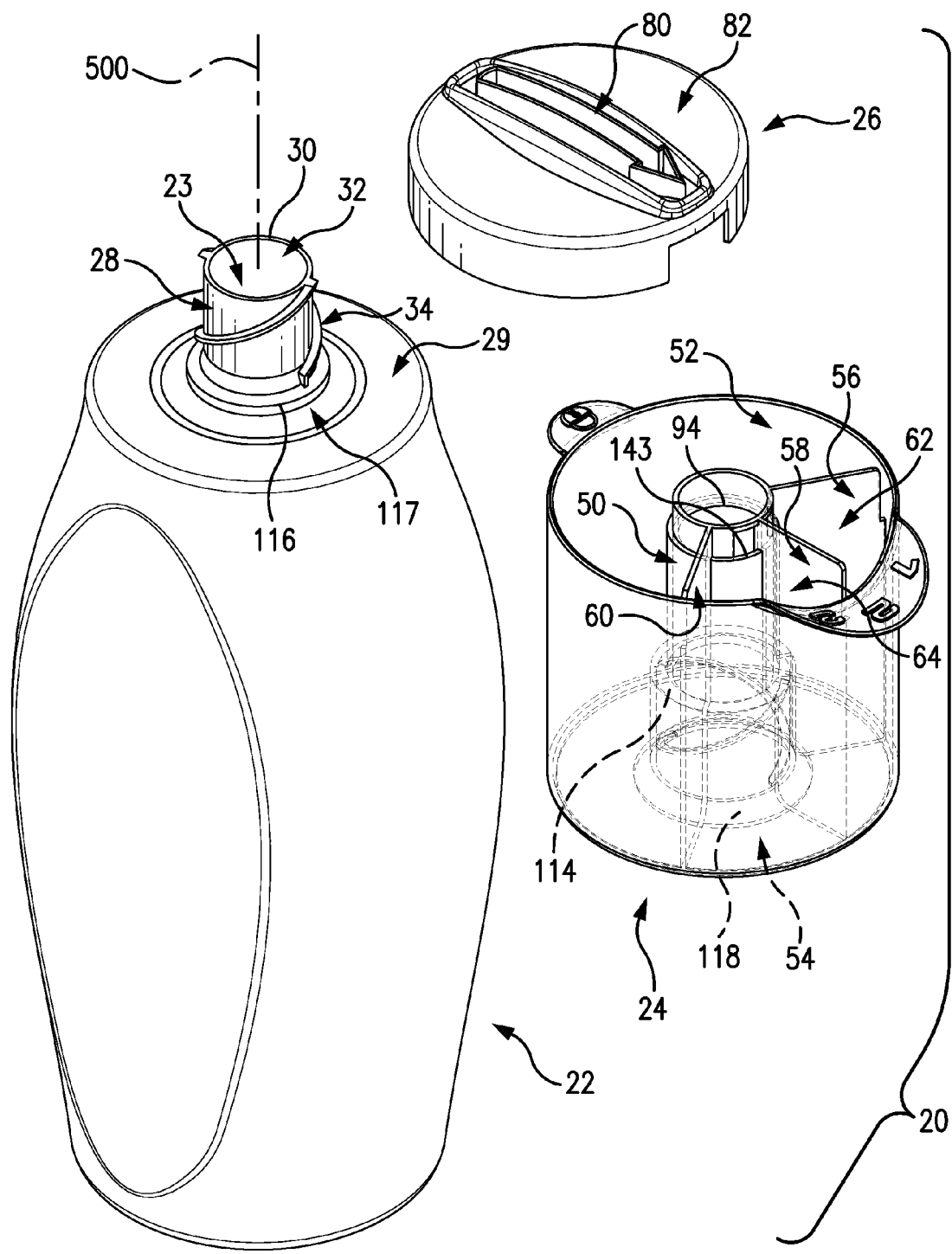
FIG. 2 is a first exploded perspective view of the dispenser of FIG. 1 with chamber member in x-ray.
Figure 6:
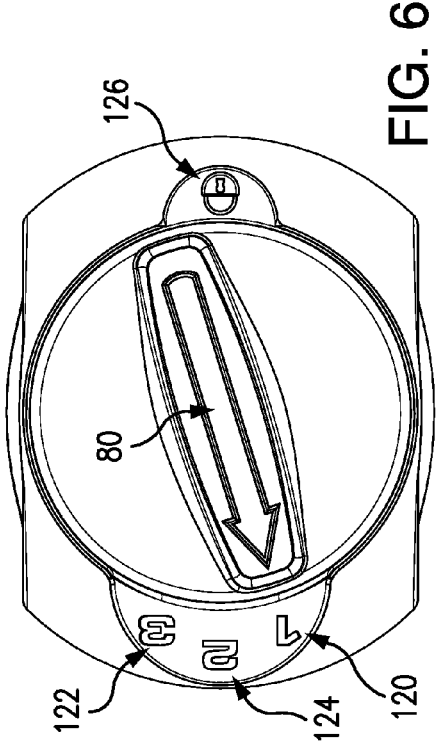
FIG. 6 is a top view of the dispenser in a first dispensing condition.
Figure 7:
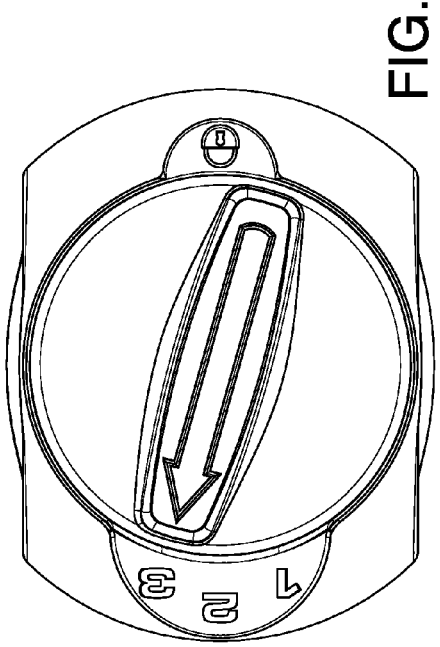
FIG. 7 is a top view of the dispenser in a second dispensing condition.
Figure 8:
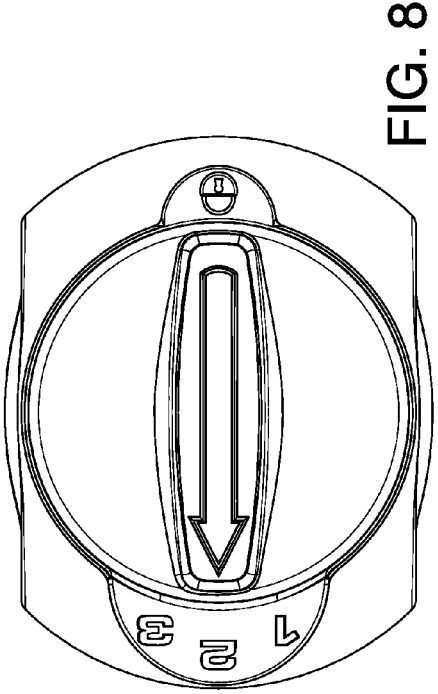
FIG. 8 is a top view of the dispenser in the free-pouring condition.
Figure 9:
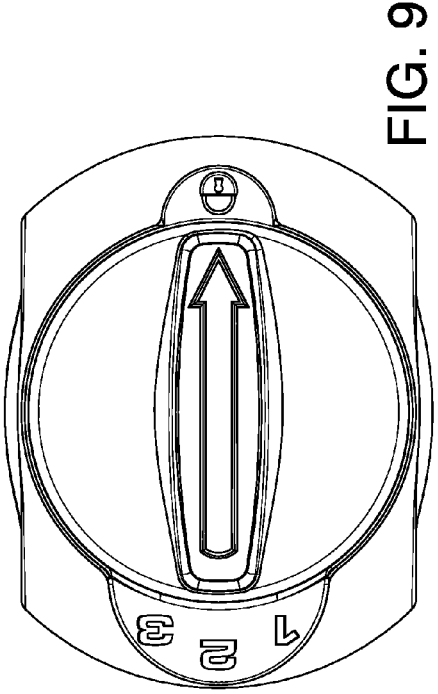
FIG. 9 is a top view of the dispenser in a closed condition.
Figure 11:
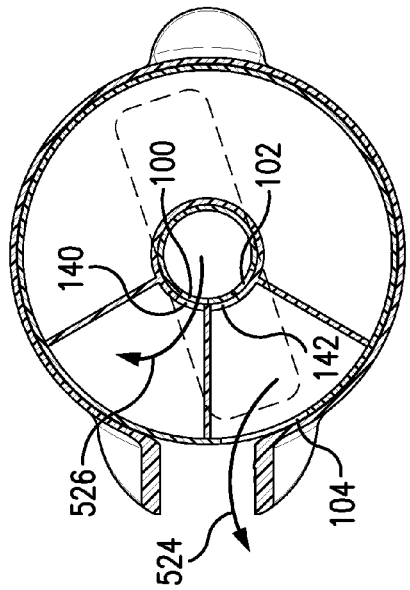
FIG. 11 is an upward sectional view of the dispenser in the second dispensing condition taken along the same cut plane.
Figure 13:
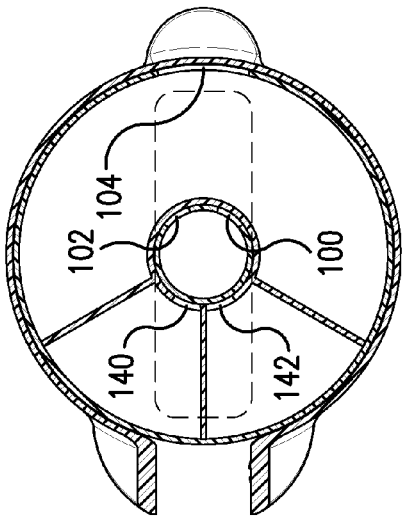
FIG. 13 is an upward sectional view of the dispenser in the closed condition taken along that same cut plane.
Figure 12:
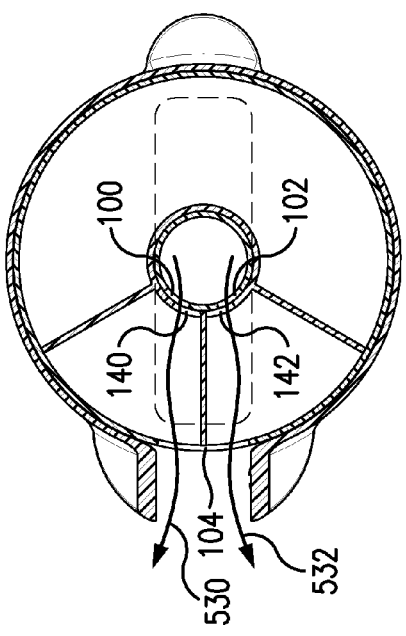
FIG. 12 is an upward sectional view of the dispenser in the free-pouring condition taken along line 12-12 of FIG. 5.

The selector is mounted to the chamber body for exemplary relative rotation about the axis 500 between a first dosing condition (FIGS. 6 & 10); a second dosing condition (FIGS. 7 & 11); a free-pouring condition (FIGS. 8 & 12); and a closed condition (FIGS. 9 & 13). The exemplary selector comprises a transverse upper web 82 and concentric inner 84 (FIG. 3) and outer 86 interrupted/partial walls (annular sidewalls) depending from the web and which selectively block and unblock inlet and outlet ports (discussed below) of the dispensing chambers 62, 64 (with openings or gaps 100, 102 (in 84) and 104 (in 86) to selectively permit flow). FIG. 3 further shows a lower rim 90 of the outer wall and the aforementioned rib 92 at the lower end/rim of the inner wall 84. The rib 92 projects radially outward and is received in a channel 94 (FIG. 2) in the inboard (inner diameter (ID)) surface of the chamber body inner wall 50 (FIG. 2) to provide the axial retention while permitting rotation of the selector relative to the chamber body member.

For providing a seal (a double seal) of the chamber body member to the bottle body, the chamber body member and bottle body may have complementary sealing surfaces which engage each other in the installed condition. A first sealing surface of the container body is formed by the rim 30. Its complementary first sealing surface of the chamber body member is formed by the underside 114 of an internal shoulder in the inner sidewall 50 between a relatively smaller diameter upper portion and a relatively larger diameter lower portion (along which lower portion the internal thread or channel 66 is formed).

An exemplary second sealing feature of the bottle body comprises the annular corner 116 of an annular boss or protrusion 117 at the junction of a lower portion of the neck 28 and an inboard portion of the shoulder 29. In the installed condition, the corner 116 engages a complementary surface 118. The exemplary surface 118 is formed along a convex bevel between the lower surface of the bottom wall 54 and the ID surface of the inner wall 50 of the chamber member.

FIGS. 6-9 show the indicator 80 (e.g., as an arrow) as part of indicator means which further include indicia 120, 122, 124, and 126 on the chamber body member indicating the respective conditions. Other indicia may be used and the system may be reversed with individual indicia on the selector and a single indicator on the chamber body.

Whereas FIGS. 6-9 are viewed downward, corresponding FIGS. 10-13 are viewed upward thus circumferential directions appear reversed.

Figure 10:
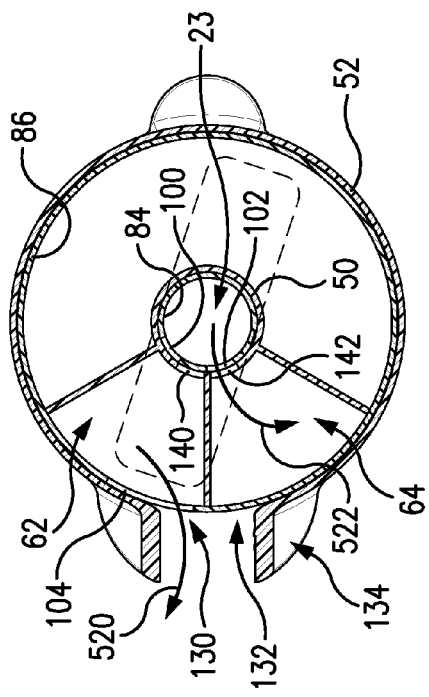
FIG. 10 is an upward sectional view of the dispenser in the first dispensing condition, taken along the same cut plane as FIG. 12 below.

Each of the two chambers 62 and 64 has an outlet opening 130, 132 in an upper portion of the outer sidewall 52. In the exemplary embodiment, these two openings form adjacent halves of a single larger opening along a spout 134. In the exemplary embodiment, the indicia 120, 124, and 122 are formed along an upper (pouring) surface of the spout. Along the inner wall 50 each of the two chambers has a respective inlet opening (port) 140, 142. These may be fully internal windows or may be recesses extending downward from a rim of the wall 50. FIG. 10 also shows the aforementioned openings 100, 102 in the inner wall 84 of the selector.

In the first dosing condition: flow 520 is not blocked from the first chamber out the opening (e.g., the selector does not block an outlet port 130 of the first chamber at the side of the central vane); flow is blocked from the second chamber out the opening (e.g., the selector blocks an outlet port 132 of the second chamber at the side of the central vane); flow is blocked from the bottle interior to the first chamber (e.g., port 140 is blocked by the selector inner sidewall); and flow 522 is not blocked from the bottle interior (through selector inner sidewall port/opening 102 and inlet port 142 of the second chamber) to the second chamber. Inclining or partially inverting in this condition discharges 520 the first chamber and fills 522 the second chamber. The second chamber inlet port has a lower extremity 143 (FIG. 2 as the first chamber inlet port also has) height above a bottom of the second chamber such that re-uprighting allows a partial drainback from the second chamber to the bottle interior to eliminate a slight overfilling so that the second chamber contains the exact desired dose. This drainback helps reduce variations caused by differing degrees of dispensing inclination, differing effects of the volume remaining in the bottle, etc.

In the second dosing condition (FIG. 11): flow is blocked from the first chamber out the opening; flow 524 is not blocked from the second chamber out the opening; flow 526 is not blocked from the bottle interior to the first chamber (via ports 100 and 140); and flow is blocked from the bottle interior to the second chamber (port 142 is blocked). Inclining or partially inverting in this condition discharges the second chamber and fills the first chamber. Reuprighting causes a drainback from the first chamber similar to that described above.

In the free-pouring condition (FIG. 12), flow 530, 532 is not blocked from the bottle interior, through the first and second chambers and out the opening. Inclining or partially inverting in this condition allows free pouring from the bottle interior. Re-uprighting may leave both chambers with doses.

In the closed condition (FIG. 13), flow is blocked from the bottle interior into both the first and second chambers and is blocked from the first and second chambers out the opening. This may be an initial transport condition. After use, it may also serve as a storage condition (however, storage may also be in the last of the first dosing condition or second dosing condition).

One or more embodiments of the present invention have been described. Nevertheless, it will be understood that various modifications may be made without departing from the spirit and scope of the invention. For example, the nature of the particular product to be dispensed may influence details of any particular embodiment. The bottle body may be based on the overall configuration of an existing or yet-developed conventional bottle for such product. Tamper-evident features may also be included. Accordingly, other embodiments are within the scope of the following claims.

What is claimed is:
1. An apparatus (20) comprising:
a bottle body (22) having an interior (23) for storing a flowable material;
a chamber member (24) mounted to the bottle body and having an opening (130, 132) and partially bounding a first chamber (62) and a second chamber (64); and
a selector (26) mounted for rotation relative to the chamber member between a free pouring condition, a first dosing condition and a second dosing condition,
wherein:
in the free-pouring condition, flow (530, 532) is not blocked from the bottle interior (23), through the first (62) and second (64) chambers and out the opening;
in the first dosing condition:
flow (520) is not blocked from the first chamber out the opening;

flow is blocked from the second chamber out the opening;
flow is blocked from the bottle interior to the first chamber; and
flow (522) is not blocked from the bottle interior to the second chamber; and
in the second dosing condition:
flow is blocked from the first chamber out the opening;
flow (524) is not blocked from the second chamber out the opening;
flow (526) is not blocked from the bottle interior to the first chamber; and
flow is blocked from the bottle interior to the second chamber.

2. The apparatus of claim 1 wherein:
the selector is mounted for rotation relative to the chamber member between said first dosing condition, said second dosing condition, a closed condition; and
in the closed condition, flow is blocked from the bottle interior (23) into both the first and second chambers and is blocked from the first (62) and second (64) chambers out the opening.

3. The apparatus of claim 2 wherein:
the selector and chamber member combined to provide means for identifying each of the first dosing condition, second dosing condition, free-pouring condition, and closed condition.

4. The apparatus of claim 1 wherein:
the selector is mounted for rotation relative to the chamber member between said free pouring condition, said first dosing condition, said second dosing condition, and a closed condition; and
in the closed condition, flow is blocked from the bottle interior (23) into both the first and second chambers and is blocked from the first (62) and second (64) chambers out the opening.

5. The apparatus of claim 1 wherein:
a dose volume of the first chamber and of the second chamber is 15-75 ml.

6. The apparatus of claim 1 wherein:
a dose volume of the first chamber and of the second chamber is 20-40 ml.

7. The apparatus of claim 1 wherein:
the chamber member (24) and selector (26) are each a single separate piece assembled to each other.

8. The apparatus of claim 1 wherein:
the bottle body is polyethylene; and
the chamber member and selector are polypropylene.

9. The apparatus of claim 1 further comprising:
a flowable material within the bottle body.

10. The apparatus of claim 1 wherein:
the bottle body interior has a volume of 0.4-2.0 l.

11. A method for manufacturing the apparatus of claim 1, the method comprising:
securing the chamber member to the bottle body; and
securing the selector to the chamber member.

12. The method of claim 11 wherein:
the securing of the chamber member comprises locking to prevent rotation and extraction; and
the securing of the selector comprises snapping onto the chamber member to permit rotation between at least said first dosing condition and second dosing condition.

13. The apparatus of claim 1 wherein:
the chamber member is threaded onto a neck of the bottle body.

14. A method for using the apparatus of claim 1 comprising:
inclining the apparatus in the first dosing condition to pour (520) a first dose of material from the first chamber and introduce (522) a second dose of the material to the second chamber;
rotating the selector to the second dosing condition to isolate, relative to the bottle interior, the second chamber; and
inclining the apparatus in the second dosing condition to pour (524) the second dose of material from the second chamber and replenish (526) the first dose of the material in the first chamber.

15. A method for using an apparatus (20), the apparatus comprising:
a bottle body (22) having an interior (23) for storing a flowable material;
a chamber member (24) mounted to the bottle body and having an opening (130, 132) and partially bounding a first chamber (62) and a second chamber (64); and
a selector (26) mounted for rotation relative to the chamber member between a first dosing condition and a second dosing condition,
wherein:
in the first dosing condition:
flow (520) is not blocked from the first chamber out the opening;
flow is blocked from the second chamber out the opening;
flow is blocked from the bottle interior to the first chamber; and
flow (522) is not blocked from the bottle interior to the second chamber; and
in the second dosing condition:
flow is blocked from the first chamber out the opening;
flow (524) is not blocked from the second chamber out the opening;
flow (526) is not blocked from the bottle interior to the first chamber; and
flow is blocked from the bottle interior to the second chamber,
the method comprising:
inclining the apparatus in the first dosing condition to pour (520) a first dose of material from the first chamber and introduce (522) a second dose of the material to the second chamber;
rotating the selector to the second dosing condition to isolate, relative to the bottle interior, the second chamber; and
inclining the bottle body in the second dosing condition to pour (524) the second dose of material from the second chamber and replenish (526) the first dose of the material in the first chamber.

16. The method of claim 15 further comprising:
rotating the selector (26) to the free-pouring condition; and
in the free-pouring condition, inclining the bottle body to cause flow (530, 532) from the bottle interior (23), through the first (62) and second (64) chambers in parallel, and out the opening.

17. The method of claim 15 wherein:
the introducing (522) of the second dose comprises an overfilling;
a re-uprighting allows partial drainback from the second chamber to eliminate the overfilling of the second dose; and
the replenishing (526) of the first dose comprises an overfilling; and a second re-uprighting causes partial drainback from the first chamber to eliminate the overfilling of the first dose.

18. The method of claim 15 further comprising:
rotating the selector to a free-pouring condition; and
in the free-pouring condition, pouring material from the bottle body interior out of the apparatus.

19. The method of claim 18 wherein:
a re-uprighting after the pouring leaves both the first chamber and the second chamber containing doses of the flowable material.

20. An apparatus (20) comprising:
a bottle body (22) having an interior (23) for storing a flowable material;
a chamber member (24) mounted to the bottle body and having an opening (130, 132) and partially bounding a first chamber (62) and a second chamber (64); and
a selector (26) mounted for rotation relative to the chamber member between a first dosing condition and a second dosing condition,
wherein:
in the first dosing condition:
flow (520) is not blocked from the first chamber out the opening;
flow is blocked from the second chamber out the opening;
flow is blocked from the bottle interior to the first chamber; and
flow (522) is not blocked from the bottle interior to the second chamber;
in the second dosing condition:
flow is blocked from the first chamber out the opening;
flow (524) is not blocked from the second chamber out the opening;
flow (526) is not blocked from the bottle interior to the first chamber; and
flow is blocked from the bottle interior to the second chamber;
the chamber member is secured to the bottle body against rotation and extraction; and
the selector is secured to the chamber member via snap engagement permitting rotation between at least the first dosing condition and said second dosing condition.

21. The apparatus of claim 20 wherein:
the selector is held for rotation via a cooperating rib and channel.

22. An apparatus (20) comprising:
a bottle body (22) having an interior (23) for storing a flowable material and having a neck (28) with an external thread (34);
a chamber member (24) mounted to the bottle body and having an opening (130, 132) and partially bounding a first chamber (62) and a second chamber (64) and having:
an inner wall (50);
an outer wall (52); and
an annular bottom wall (54) joining the inner wall and the outer wall, the inner wall bearing a feature (66) for engaging the external thread; and
a selector (26) mounted for rotation relative to the chamber member between a first dosing condition and a second dosing condition,
wherein:
in the first dosing condition:
flow (520) is not blocked from the first chamber out the opening;
flow is blocked from the second chamber out the opening;
flow is blocked from the bottle interior to the first chamber; and
flow (522) is not blocked from the bottle interior to the second chamber; and
in the second dosing condition:
flow is blocked from the first chamber out the opening;
flow (524) is not blocked from the second chamber out the opening;
flow (526) is not blocked from the bottle interior to the first chamber; and
flow is blocked from the bottle interior to the second chamber.

23. The apparatus of claim 22 wherein:
the chamber member comprises vertical radial vanes (56, 58, 60) between the inner wall, outer wall, and bottom wall, to define the first chamber and the second chamber.

24. The dispenser of claim 23 wherein:
the chamber member is a single piece.

* * * * *